United States Patent
Kamiya et al.

(10) Patent No.: US 9,272,694 B2
(45) Date of Patent: Mar. 1, 2016

(54) HYDRAULIC BRAKING SYSTEM

(71) Applicants: Yusuke Kamiya, Okazaki (JP); Akira Sakai, Toyota (JP); Kiyoyuki Uchida, Konan (JP)

(72) Inventors: Yusuke Kamiya, Okazaki (JP); Akira Sakai, Toyota (JP); Kiyoyuki Uchida, Konan (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/380,184

(22) PCT Filed: Feb. 15, 2013

(86) PCT No.: PCT/JP2013/054635
§ 371 (c)(1),
(2) Date: Aug. 21, 2014

(87) PCT Pub. No.: WO2013/125715
PCT Pub. Date: Aug. 29, 2013

(65) Prior Publication Data
US 2015/0021980 A1  Jan. 22, 2015

(30) Foreign Application Priority Data
Feb. 22, 2012 (JP) ................. 2012-036004

(51) Int. Cl.
*B60T 11/16* (2006.01)
*B60T 8/32* (2006.01)
*B60T 8/36* (2006.01)
(Continued)

(52) U.S. Cl.
CPC ............... *B60T 11/16* (2013.01); *B60T 7/042* (2013.01); *B60T 8/3265* (2013.01); *B60T 8/3655* (2013.01); *B60T 8/4077* (2013.01); *B60T 8/441* (2013.01); *B60T 11/28* (2013.01); *B60T 13/147* (2013.01); *B60T 13/662* (2013.01); *B60T 13/686* (2013.01)

(58) Field of Classification Search
CPC ..... B60T 13/58; B60T 13/161; B60T 13/142; B60T 13/686; B60T 11/16; B60T 11/28; B60T 13/147; B60T 13/662; B60T 7/042; B60T 8/3265; B60T 8/3655; B60T 8/4077; B60T 8/441
See application file for complete search history.

(56) References Cited

U.S. PATENT DOCUMENTS 8,657,388 B2 * 2/2014 Drumm et al. ............ 303/114.1
2011/0285199 A1 * 11/2011 Ishida ............................ 303/3

FOREIGN PATENT DOCUMENTS

JP     2008 24098     2/2008

OTHER PUBLICATIONS

International Search Report Issued May 10, 2013 in PCT/JP13/054635 Filed Feb. 15, 2013.

*Primary Examiner* — Vishal Sahni
(74) *Attorney, Agent, or Firm* — Oblon, McClelland, Maier & Neustadt, L.L.P.

(57) ABSTRACT

A hydraulic braking system includes: a cylinder device including a pressurizing piston, a rear chamber, and a front pressure chamber on opposite sides of the pressurizing piston; a brake cylinder coupled to the front pressure chamber; a regulator including a control piston, an input chamber provided at a rear of the control piston, and an output chamber coupled to the rear chamber in front of the control piston; and an input-hydraulic-pressure control device including a high-flow-rate supply unit configured, when an operation of the regulator is started, to supply the working fluid to the input chamber at a set flow rate; and a low-flow-rate supply unit configured, when the supply is finished, to supply the working fluid to the input chamber at a flow rate less than the set flow rate.

8 Claims, 8 Drawing Sheets

(51) Int. Cl.
*B60T 8/40* (2006.01)
*B60T 8/44* (2006.01)
*B60T 13/14* (2006.01)
*B60T 11/28* (2006.01)
*B60T 7/04* (2006.01)
*B60T 13/66* (2006.01)
*B60T 13/68* (2006.01)

HYDRAULIC BRAKING SYSTEM

TECHNICAL FIELD

The present invention relates to a hydraulic braking system equipped with a regulator.

BACKGROUND ART

Patent document 1 discloses a hydraulic braking system including: (i) a cylinder device including (a) a housing, (b) a pressurizing piston fluid-tightly and slidably fitted in the housing, (c) a front pressure chamber provided in front of the pressurizing piston, and (d) a rear chamber provided at a rear of the pressurizing piston; and (ii) a brake cylinder, coupled to the front pressure chamber, for a hydraulic brake for restraining rotation of a wheel.

When the pressurizing piston is located at its back end position in this cylinder device, the front pressure chamber communicates with the reservoir. Brake fluid is supplied to the rear chamber to advance the pressurizing piston, causing the front pressure chamber to be disconnected from the reservoir to produce hydraulic pressure. This hydraulic pressure is supplied to the brake cylinder to activate the hydraulic brake.

PRIOR ART DOCUMENT

Patent Document

Patent Document 1: Japanese Patent Application Publication No. 2008-24098

SUMMARY OF THE INVENTION

Problem to be Solved by the Invention

This invention has been developed to improve a hydraulic braking system with a regulator, for example, at least one of to improve a response and to damp pulsation.

Means for Solving Problem

The present invention provides a hydraulic braking system comprising: (i) a cylinder device provided for a vehicle and comprising (a) a housing, (b) a pressurizing piston fluid-tightly and slidably fitted in the housing, (c) a rear chamber provided at a rear of the pressurizing piston, and (d) a front pressure chamber provided in front of the pressurizing piston, wherein the pressurizing piston is advanced by hydraulic pressure in the rear chamber, causing the front pressure chamber to be disconnected from a low pressure source to produce hydraulic pressure; (ii) a brake cylinder, coupled to the front pressure chamber, for a hydraulic brake capable of restraining rotation of a wheel of the vehicle; (iii) a regulator comprising (a) a housing, (b) a control piston fluid-tightly and slidably fitted in the housing, (c) an input chamber provided at a rear of the control piston, and (d) an output chamber provided in front of the control piston and coupled to the rear chamber; and (iv) an input-hydraulic-pressure control device configured to supply working fluid to the input chamber to advance the control piston, causing the output chamber to be disconnected from the low pressure source to produce hydraulic pressure, wherein the input-hydraulic-pressure control device comprises at least one of (x) a high-flow-rate supply unit configured, when an operation of the regulator is started, to supply the working fluid to the input chamber at a set flow rate; and (y) a low-flow-rate supply unit configured, after the output chamber is disconnected from the low pressure source, to supply the working fluid to the input chamber at a flow rate that is less than the set flow rate.

The control of the hydraulic pressure in the input chamber by the regulator controls hydraulic pressure in the output chamber, which controls the hydraulic pressure in the rear chamber of the cylinder device. Accordingly, hydraulic pressure in the front pressure chamber is controlled to control hydraulic pressure in the brake cylinder.

In a non-operating state of the regulator, the control piston is located at its back end position where the low pressure source communicates with the output chamber so that the hydraulic pressure in the output chamber is atmospheric pressure. When the regulator is started to be operated, the working fluid is supplied to the input chamber to advance the control piston, causing the output chamber to be disconnected from the low pressure source. When the flow rate of the working fluid supplied to the input chamber is increased in this operation, the control piston can be speedily advanced, so that the output chamber can be speedily disconnected from the low pressure source, thereby improving a reaction.

Also, when the flow rate of the working fluid supplied to the input chamber is reduced after the output chamber is disconnected from the low pressure source, the flow rate of the working fluid supplied from the output chamber to the rear chamber can be reduced, making it possible to advance the pressurizing piston in the cylinder device at a slow speed. This slow advance can damp pulsation in the cylinder device or restrain generation of this pulsation, which can reduce operating noises due to the pulsation and restrain generation of these noises.

Forms of the Invention

There will be described by way of examples inventions recognized to be claimable by the present applicant or features of the inventions.

(1) A hydraulic braking system comprising:

a cylinder device provided for a vehicle and comprising (a) a housing, (b) a pressurizing piston fluid-tightly and slidably fitted in the housing, (c) a rear chamber provided at a rear of the pressurizing piston, and (d) a front pressure chamber provided in front of the pressurizing piston, wherein the pressurizing piston is advanced by hydraulic pressure in the rear chamber, causing the front pressure chamber to be disconnected from a low pressure source to produce hydraulic pressure;

a brake cylinder, coupled to the front pressure chamber, for a hydraulic brake capable of restraining rotation of a wheel of the vehicle;

a regulator comprising (e) a housing, (f) a control piston fluid-tightly and slidably fitted in the housing, (g) an input chamber provided at a rear of the control piston, and (h) an output chamber provided in front of the control piston and coupled to the rear chamber; and an input-hydraulic-pressure control device configured to supply working fluid to the input chamber to advance the control piston, causing the output chamber to be disconnected from the low pressure source to produce hydraulic pressure in the output chamber, the input-hydraulic-pressure control device comprising:

a high-flow-rate supply unit configured, when an operation of the regulator is started, to supply the working fluid to the input chamber at a set flow rate.

The set flow rate may be a fixed value or a variable value.

The high-flow-rate supply unit may supply the working fluid to the input chamber for a predetermined set length of time or until the hydraulic pressure in the output chamber reaches a set pressure, for example. The set length of time can be determined, for example, based on a length of time required for the control piston to move from its back end position to a disconnecting position (where the output chamber is disconnected from the low pressure source) when the working fluid flows into the input chamber at the set flow rate. The set pressure can be determined as a pressure that can cause the control piston to be considered to be advanced, for example. In other words, this set pressure can be determined as a first set pressure which will be described below, for example.

Also, the output chamber and the rear chamber may be directly connected to each other hydraulically without components such as electromagnetic control valves therebetween or may be indirectly coupled to each other hydraulically with components such as a pressurization device and electromagnetic control valves therebetween. When the output chamber and the rear chamber are directly connected to each other, the hydraulic pressure in the output chamber and the hydraulic pressure in the rear chamber are equal to each other. However, when the output chamber and the rear chamber are indirectly connected to each other, the hydraulic pressure in the output chamber and the hydraulic pressure in the rear chamber are not always equal to each other (2) The hydraulic braking system according to the above form (1), wherein the high-flow-rate supply unit comprises a set-flow-rate determination unit configured to determine the set flow rate by dividing an input fluid quantity by a target time, wherein the input fluid quantity is a quantity of the working fluid to be supplied to the input chamber which is required for the control piston to be moved from a back end position thereof to a disconnecting position at which the output chamber is disconnected from the low pressure source, and the target time is a length of time determined based on at least one of a target value of the hydraulic pressure in the output chamber and an increase gradient of the target value.

For example, in a case where the target time is determined based on, e.g., the target value of the hydraulic pressure in the output chamber and/or an increase gradient of the target value, it is possible to know urgency of the request of the hydraulic pressure in the output chamber. Thus, in the case where the target value is large or in the case where the increase gradient of the target value is large, it is preferable that the target time is short and the set flow rate is high.

(3) The hydraulic braking system according to the above form (1) or (2), wherein the input-hydraulic-pressure control device comprises a pressurization control valve provided between the input chamber and a high pressure source and allowing the working fluid to flow at a higher flow rate in a case where a large supply current is supplied to a coil than in a case where a small supply current is supplied to the coil, and wherein the high-flow-rate supply unit comprises a current control unit configured to control a flow rate of the working fluid by controlling the supply current supplied to the coil of the pressurization control valve.

The pressurization control valve has a characteristic in which the allowed flow rate of the working fluid is larger in the case where the supply current is large than in the case where the supply current is small.

(4) The hydraulic braking system according to the above form (3), wherein the pressurization control valve has a characteristic in which a relationship between the supply current supplied to the coil and the flow rate is determined by a high-low pressure differential, and wherein the high-flow-rate supply unit further comprises a start-current determination unit configured to determine an amount of the supply current on the basis of the relationship determined by the high-low pressure differential in the pressurization control valve.

The pressurization control valve may be designed to have a characteristic in which an increase gradient of the flow rate with respect to an increase amount of the supply current is smaller in the case where the high-low pressure differential is large than in the case where the high-low pressure differential is small, for example. In an electromagnetic control valve in which a pressure differential force related to the high-low pressure differential and an electromagnetic motive force related to the supply current supplied to the coil act in a direction in which a body is moved away from a seat, and an urging force of a spring acts in a direction in which the body is seated against the seat, it is estimated that where the high-low pressure differential is small, an increase gradient of the flow rate with respect to an increase in the electromagnetic motive force becomes larger because the magnitude of the electromagnetic motive force has a greater effect on the urging force of the spring, i.e., a degree of opening or the flow rate.

As shown in FIG. 3(c), assuming that the flow rate of the working fluid allowed in the pressurization control valve is defined as a set flow rate q, the supply current is larger in the case where the high-low pressure differential is large than in the case where the high-low pressure differential is small.

It is noted that in the case where a relationship between the degree of opening and the flow rate and a relationship between the degree of opening and the supply current are known, the amount of the supply current may be determined based on a relationship between the degree of opening and the supply current.

(5) The hydraulic braking system according to any one of the above forms (1) through (4), wherein the high-flow-rate supply unit is configured to supply the working fluid to the input chamber at the set flow rate until the hydraulic pressure in the output chamber reaches the first set pressure, wherein the first set pressure has a magnitude in which the control piston is advanced by a force related to the hydraulic pressure in the input chamber such that the output chamber is considered to be disconnected from the low pressure source.

(6) The hydraulic braking system according to the above form (5), wherein the input-hydraulic-pressure control device comprises (a) a pressure-reduction control valve provided between the input chamber and the low pressure source and configured to be changed from a closed state to an open state when the hydraulic pressure in the input chamber is raised with respect to a supply current supplied to a coil of the pressure-reduction control valve and (b) a first pressure-reduction-valve control unit configured to supply, to the coil of the pressure-reduction control valve, a current having a magnitude that causes the pressure-reduction control valve to be changed from the closed state to the open state, when the hydraulic pressure in the input chamber exceeds a first input set pressure corresponding to the first set pressure for the output chamber.

Where the pressure-reduction control valve is used as a pressure differential valve in the form of a relief valve, the hydraulic pressure in the output chamber can be prevented from becoming excessively high, making it difficult for the hydraulic pressure in the output chamber to exceed the first set pressure.

A predetermined relationship determined by, e.g., a structure of the regulator is established between the hydraulic pressure in the output chamber and the hydraulic pressure in the input chamber. Thus, the first input set pressure can be obtained based on this relationship and the first set pressure for the output chamber. The first input set pressure can be determined to have a magnitude that is determined based on the lowermost magnitude of the hydraulic pressure in the input chamber which can advance the control piston. For example, the first input set pressure can be determined as the lowermost hydraulic pressure or a value close to the lowermost hydraulic pressure and higher than the lowermost hydraulic pressure by a set value, for example.

(7) The hydraulic braking system according to the above form (6), wherein the pressure-reduction control valve is configured to be in the open state when the supply current for the coil of the pressure-reduction control valve is smaller than a valve opening current that is higher in a case where the hydraulic pressure in the input chamber is high than in a case where the hydraulic pressure in the input chamber is low, and wherein the first pressure-reduction-valve control unit comprises a pressure-reduction-valve current determination unit configured to determine the supply current for the coil of the pressure-reduction control valve based on the valve opening current in a case where the hydraulic pressure in the input chamber is the first input set pressure.

Where an amount of the supply current for the coil of the pressure-reduction control valve is determined based on a valve opening current causing the pressure-reduction control valve to take the open state at the first input set pressure, the hydraulic pressure in the output chamber can be built up to the first set pressure without exceeding the first set pressure. Also, the supply current can be determined at a current larger or smaller than the valve opening current by a set value with consideration of, e.g., variations of the valve opening current.

(8) The hydraulic braking system according to any one of the above forms (1) through (7), wherein the input-hydraulic-pressure control device further comprises a low-flow-rate supply unit configured, when the supply of the working fluid by the high-flow-rate supply unit is finished, to supply the working fluid to the input chamber at a flow rate that is less than the set flow rate.

(9) The hydraulic braking system according to the above form (8), wherein the low-flow-rate supply unit is configured to supply the working fluid to the input chamber at the flow rate less than the set flow rate until the hydraulic pressure in the output chamber reaches a second set pressure from the disconnection of the output chamber from the low pressure source, wherein the second set pressure has a magnitude in which the pressurizing piston is advanced by a force related to the hydraulic pressure in the rear chamber such that the front pressure chamber is considered to be disconnected from the low pressure source.

The second set pressure is higher than the first set pressure. For example, the second set pressure can be determined as a value determined based on a lowermost value of the hydraulic pressure in the rear chamber which can advance the pressurizing piston of the cylinder device, for example, the second set pressure can be determined as the lowermost value or the sum of the lowermost value and a set value.

The hydraulic pressure in the output chamber is supplied to the rear chamber. When the forward force applied to the pressurizing piston by the hydraulic pressure in the rear chamber becomes larger than a set load of a return spring, the pressurizing piston is advanced. Also, when the reservoir port is disconnected by the advance of the pressurizing piston, and the front pressure chamber is disconnected from the low pressure source, the hydraulic pressure in the front pressure chamber rises.

In this situation, in a case where the input flow rate of the working fluid supplied to the input chamber is high, and the flow rate of the working fluid supplied from the output chamber to the rear chamber is high, when the force applied to the pressurizing piston by the hydraulic pressure in the rear chamber becomes equal to or larger than the set load of the return spring, the pressurizing piston is abruptly advanced, which sharply raises the hydraulic pressure in the front pressure chamber. The hydraulic pressure in the rear chamber also increases sharply, and the hydraulic pressure in the output chamber increases sharply in the regulator. This moves the control piston of the regulator backward, which transiently lowers the hydraulic pressure in the output chamber and the hydraulic pressure in the rear chamber sharply, causing the pulsation. This pulsation causes operating noises.

However, when the input flow rate of the working fluid supplied to the input chamber is reduced, the flow rate of the working fluid supplied from the output chamber to the rear chamber is also reduced, which restrains a sharp and abrupt advance of the pressurizing piston, preventing a sharp increase in the hydraulic pressure in the front pressure chamber. This makes it possible to damp the pulsation or restrain generation of the pulsation, and accordingly reduce the operating noises due to the pulsation or restrain generation of the operating noises.

(10) The hydraulic braking system according to the above form (8) or (9), wherein the high-flow-rate supply unit is configured to supply the working fluid to the input chamber at the set flow rate until the hydraulic pressure in the output chamber reaches a first set pressure, wherein the input-hydraulic-pressure control device comprises a pressurization control valve provided between the input chamber and a high pressure source and having a characteristic in which a valve opening current is larger in a case where the hydraulic pressure in the input chamber is high than in a case where the hydraulic pressure in the input chamber is low, and wherein the low-flow-rate supply unit comprises a pressurization-valve control unit configured, when the hydraulic pressure in the output chamber is higher than the first set pressure and equal to or lower than a second the set pressure, to supply a current to the pressurization control valve, a magnitude of the current being determined based on the valve opening current.

Where the supply current for the pressurization control valve is determined to have a magnitude determined based on the valve opening current (for example, the supply current may be the valve opening current or a value obtained by adding or subtracting a set value to or from the valve opening current), the input flow rate of the working fluid supplied to the input chamber can be restrained, making it possible to restrain the flow rate of the working fluid supplied from the output chamber to the rear chamber.

As shown in FIG. 3(d), a relationship between the supply current and the flow rate exhibits a hysteresis in the pressurization control valve. Thus, even when the supply current for the pressurization control valve is made smaller after the pressurization control valve is temporarily changed to the open state, the flow rate can be maintained. Therefore, the supply current for the pressurization linear control valve can be determined with consideration of the hysteresis.

(11) The hydraulic braking system according to any one of the above forms (8) through (10), wherein the low-flow-rate supply unit is configured, when the hydraulic pressure in the output chamber is higher than a first set pressure and equal to or lower than a second set pressure, to supply the working fluid to the input chamber at the flow rate that is less than the set flow rate, and wherein the input-hydraulic-pressure control device comprises (a) a pressure-reduction control valve provided between the input chamber and the low pressure source and configured to be changed from a closed state to an open state when the hydraulic pressure in the input chamber is raised with respect to a supply current and (b) a second pressure-reduction-valve control unit configured to supply, to the pressure-reduction control valve, a current having a magnitude that causes the pressure-reduction control valve to be changed from the closed state to the open state, when the hydraulic pressure in the input chamber exceeds a second input set pressure corresponding to the second set pressure for the output chamber in a case where the hydraulic pressure in the output chamber is higher than the first set pressure and equal to or lower than the second set pressure.

The control of the pressure-reduction control valve makes it possible to raise the hydraulic pressure in the output chamber to the second set pressure and makes it difficult for the hydraulic pressure in the output chamber to exceed the second set pressure.

(12) The hydraulic braking system according to any one of the above forms (8) through (10), wherein the low-flow-rate supply unit is configured, when the hydraulic pressure in the output chamber is higher than a first set pressure and equal to or lower than a second set pressure, to supply the working fluid to the input chamber at the flow rate that is less than the set flow rate, and wherein the input-hydraulic-pressure control device comprises (a) a pressure-reduction control valve provided between the input chamber and the low pressure source and configured to be changed from a closed state to an open state when the hydraulic pressure in the input chamber is raised with respect to a supply current for the pressure-reduction control valve and (b) a third pressure-reduction-valve control unit configured, when the hydraulic pressure in the output chamber is higher than the first set pressure and equal to or lower than the second set pressure, to increase a current supplied to the pressure-reduction control valve with an increase in the hydraulic pressure in the input chamber.

Where the supply current for the pressure-reduction control valve is increased with the increase in the hydraulic pressure in the input chamber, the pressure-reduction control valve can be kept in the closed state for the duration that the working fluid is supplied to the input chamber by the low-flow-rate supply unit. A current having a magnitude equal to the sum of a set value and the valve opening current determined by the hydraulic pressure in the input chamber may be supplied to the coil of the pressure-reduction control valve, for example.

(13) The hydraulic braking system according to any one of the above forms (8) through (12), wherein the low-flow-rate supply unit is configured to supply the working fluid to the input chamber at the flow rate less than the set flow rate until the hydraulic pressure in the output chamber reaches a second set pressure, and wherein the input-hydraulic-pressure control device comprises (a) a pressurization control valve provided between the input chamber and the high pressure source and configured to make the hydraulic pressure in the input chamber higher in a case where a supply current for a coil of the pressurization control valve is large than in a case where the supply current for the coil of the pressurization control valve is small, and (b) a pressurization-valve-current determination unit configured to make the supply current for the pressurization control valve larger in a case where the hydraulic pressure in the output chamber is higher than the second set pressure than in a case where the hydraulic pressure in the output chamber is equal to or lower than the second set pressure.

After the hydraulic pressure in the output chamber becomes higher than the second set pressure, the pressurization control valve is desirably controlled actively so as to make the hydraulic pressure in the rear chamber closer to a target hydraulic pressure.

For example, in the case where the hydraulic pressure in the output chamber is higher than the first set pressure and equal to or lower than the second set pressure, when a current having a magnitude determined by the valve opening current is supplied to the pressurization control valve and the hydraulic pressure in the output chamber becomes higher than the second set pressure, the sum {IopenA+(IFB or IFF)} of (a) a valve opening current IopenA and (b) a feedback current IFB or a feedforward current IFF can be supplied to the pressurization control valve.

(14) The hydraulic braking system according to any one of the above forms (8) through (13), wherein the low-flow-rate supply unit is configured to supply the working fluid to the input chamber at the flow rate less than the set flow rate until the hydraulic pressure in the output chamber reaches a second set pressure, and wherein the input-hydraulic-pressure control device comprises a feedback control unit configured to execute a feedback control for the hydraulic pressure in the input chamber when the hydraulic pressure in the output chamber is higher than the second set pressure.

The hydraulic pressure in the brake cylinder is controlled at a pressure determined based on the hydraulic pressure in the rear chamber (i.e., the hydraulic pressure in the output chamber), and the hydraulic pressure in the brake cylinder is controlled by the control of the hydraulic pressure in the input chamber in the regulator. The target value of the hydraulic pressure in the brake cylinder can be determined based on, e.g., an operating state of a braking member by a driver.

(15) A hydraulic braking system comprising:

a cylinder device provided for a vehicle and comprising (a) a housing, (b) a pressurizing piston fluid-tightly and slidably fitted in the housing, (c) a rear chamber provided at a rear of the pressurizing piston, and (d) a front pressure chamber provided in front of the pressurizing piston, wherein the pressurizing piston is advanced by hydraulic pressure in the rear chamber, causing the front pressure chamber to be disconnected from a low pressure source to produce hydraulic pressure;

a brake cylinder, coupled to the front pressure chamber, for a hydraulic brake capable of restraining rotation of a wheel of the vehicle;

a regulator comprising (e) a housing, (f) a control piston fluid-tightly and slidably fitted in the housing, (g) an input chamber provided at a rear of the control piston, and (h) an output chamber provided in front of the control piston and coupled to the rear chamber; and an input-hydraulic-pressure control device configured to supply working fluid to the input chamber to advance the control piston, causing the output chamber to be disconnected from the low pressure source to produce hydraulic pressure in the output chamber, the input-hydraulic-pressure control device comprising an input-flow-rate restraining unit configured to keep an input flow rate of the working fluid supplied to the input chamber less than a set flow rate for a duration that the hydraulic pressure in the output chamber is higher than a first set pressure and equal to or lower than a second set pressure in a starting operation of the regulator.

The input flow rate of the working fluid supplied to the input chamber is restrained for the duration of the time that the hydraulic pressure in the output chamber is higher than the first set pressure and equal to or lower than a second set pressure that is higher than the first set pressure. This makes it possible to damp the pulsation in the cylinder device or restrain generation of the pulsation.

The hydraulic braking system in the present form can adopt any of the technical features in the forms (1) through (14).

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 3(a)-3(d) are views for explaining a pressurization linear control valve of the hydraulic braking system, wherein FIG. 3(a) is a cross-sectional view (or a conceptual view) of the pressurization linear control valve, FIG. 3(b) is a map that represents a table having a relationship between a high-low pressure differential in the pressurization linear control valve and a valve opening current for the pressurization linear control valve, FIG. 3(c) is a view representing a relationship between a flow rate and a supply current in different cases of the high-low pressure differential in the pressurization linear control valve; and FIG. 3(d) is a view representing a relationship between a flow rate in the pressurization linear control valve and a supply current for the pressurization linear control valve;

FIGS. 4(a) and 4(b) are views for explaining a pressure-reduction linear control valve of the hydraulic braking system, wherein FIG. 4(a) is a cross-sectional view (or a conceptual view) of the pressure-reduction linear control valve, and FIG. 4(b) is a map that represents a table having a relationship between a high-low pressure differential in the pressure-reduction linear control valve and a valve opening current for the pressure-reduction linear control valve;

EMBODIMENT

Hereinafter, there will be described one embodiment of the present invention by reference to the drawings.

<Vehicle>

Figure 1:
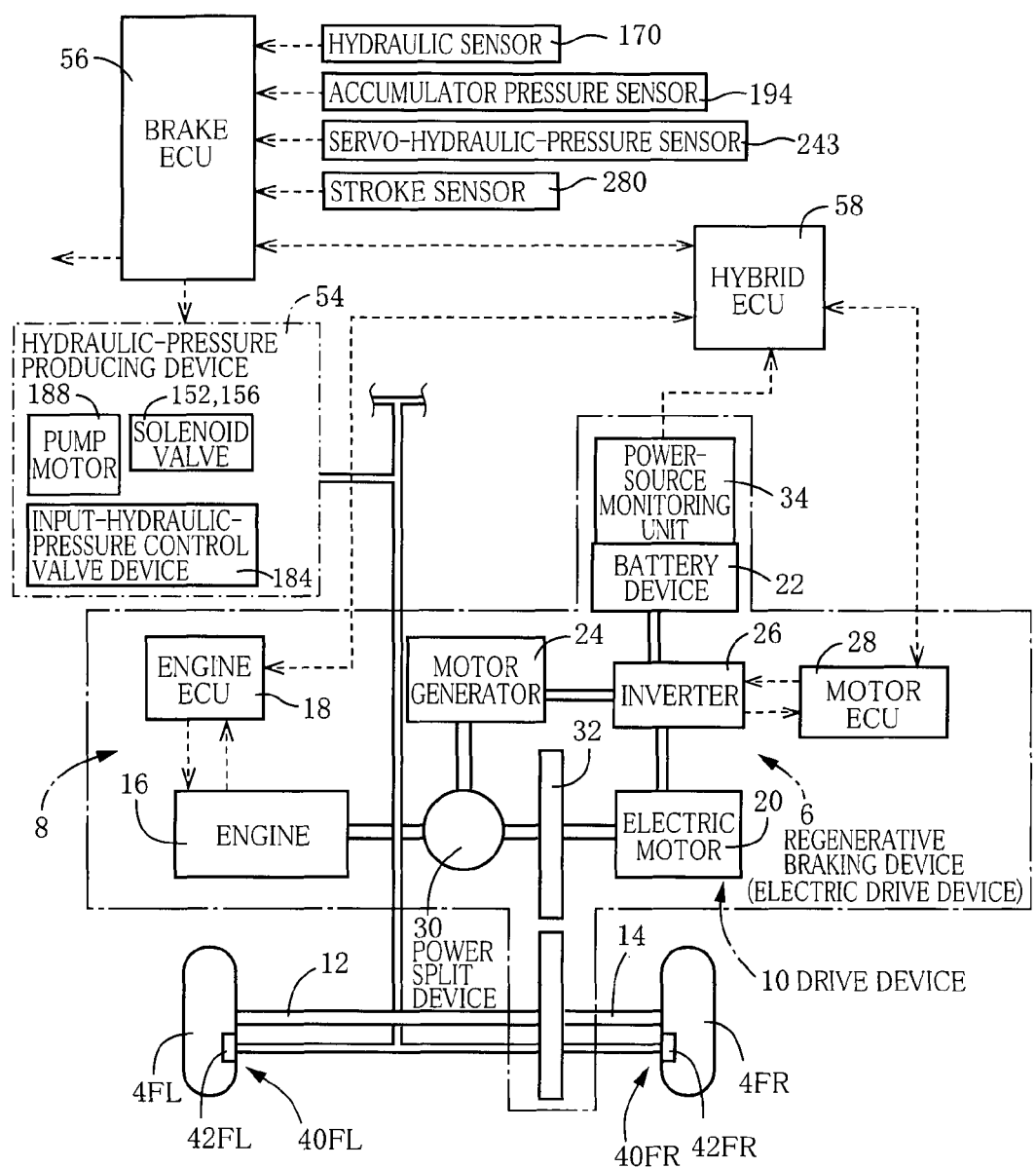
FIG. 1 is a view illustrating the entirety of a vehicle equipped with a hydraulic braking system according to an embodiment 1 of the present invention.

As shown in FIG. 1, the present hydraulic braking system is mounted on a hybrid vehicle (including a plug-in hybrid vehicle). In this hybrid vehicle, front right and left wheels 4FR, 4FL as drive wheels are driven by a drive device 10 that includes an electric drive device 6 and an internal-combustion drive device 8. A motive force or a drive force of the drive device 10 is transmitted to front left and right wheels 4FL, FR via drive shafts 12, 14, respectively. The internal-combustion drive device 8 includes an engine 16 and an engine ECU 18 configured to control an operating state of the engine 16. The electric drive device 6 includes a drive motor (hereinafter may be simply referred to as "electric motor") 20, a battery device 22, a motor generator 24, an inverter 26, and a drive motor ECU (hereinafter may be simply referred to as "motor ECU") 28. The engine 16, the electric motor 20, and the motor generator 24 are connected or coupled to a power split device 30. The flow of the force or power is switched by this power split device 30 so that only a motive force of the electric motor 20 is transmitted to an output member 32, or both a motive force of the engine 16 and the motive force of the electric motor 20 are transmitted to the output member 32, or the motive force of the engine 16 is transmitted to both the motor generator 24 and the output member 32, for example. The output member 32 is one component of a decelerator, and the motive force of the drive device 10 is transmitted to the drive shafts 12, 14 via the decelerator and differential gears.

The inverter 26 is controlled by the motor ECU 28 to selectively establish one of at least a driving state and a charging state. The driving state is a state in which the electric motor 20 is rotated by electric energy supplied from the battery device 22, and the charging state is a state in which the electric motor 20 is operated as a generator during regenerative braking to store electric energy into the battery device 22. In the charging state, a regenerative braking force is applied to the front right and left wheels 4FR, FL. In this sense, the electric drive device 6 can be called a regenerative braking device.

The battery device 22 may be equipped with a nickel-metal hydride cell or a lithium ion cell, for example. A power-source monitoring unit 34 obtains information about the charging state of the battery device 22.

Figure 2:
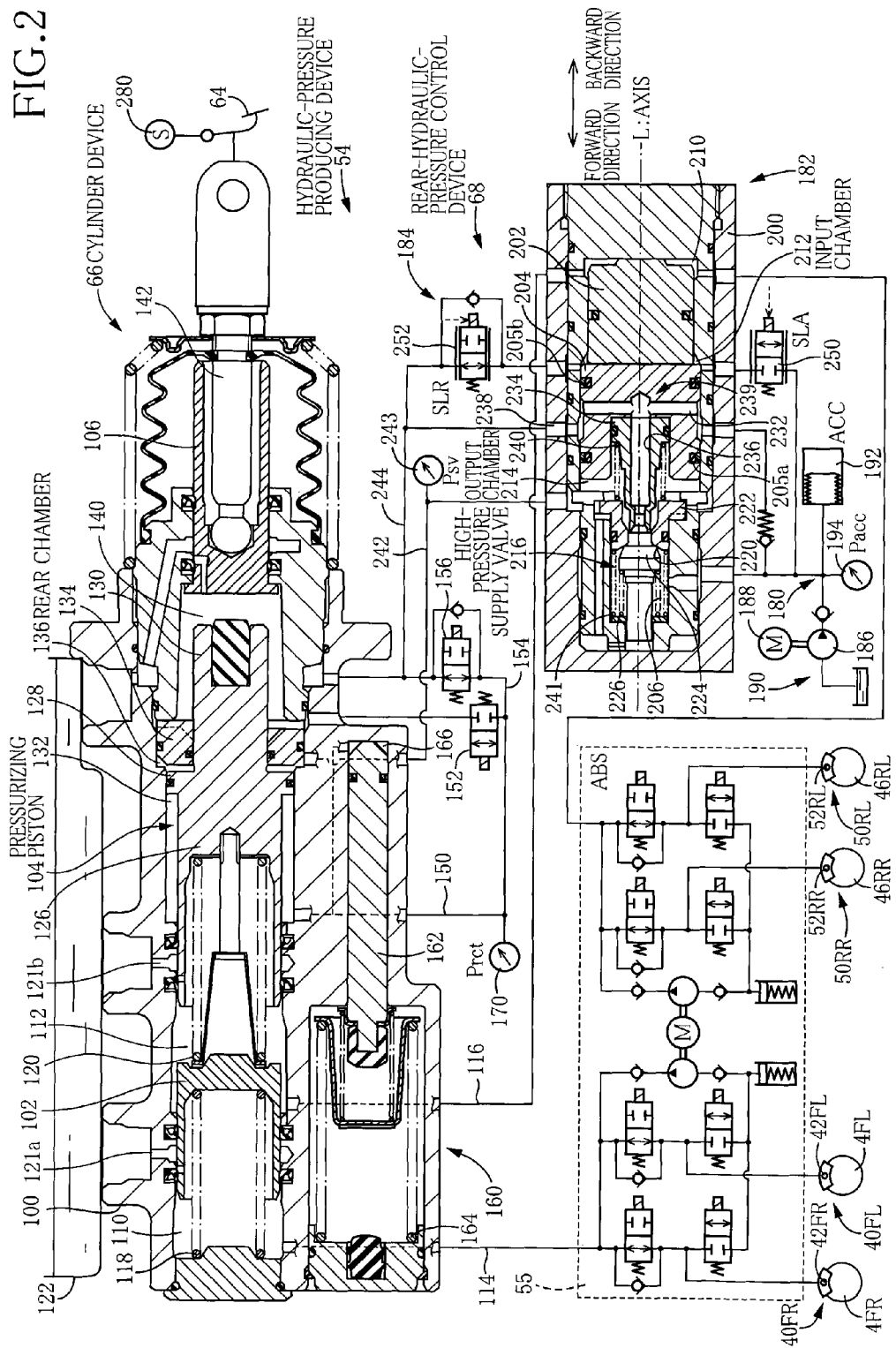
FIG. 2 is a circuit diagram of the hydraulic braking system.

As shown in FIG. 2, the hydraulic braking system includes (i) brake cylinders 42FL, FR of respective hydraulic brakes 40FL, FR provided for the respective front left and right wheels 4FL, FR and brake cylinders 52RL, RR of respective hydraulic brakes 50RL, RR provided for respective rear left and right wheels 46RL, RR, (ii) a hydraulic-pressure producing device 54 capable of supplying hydraulic pressure to these brake cylinders 42FL, FR, 52RL, RR, and (iii) a slip control device 55 provided between the hydraulic-pressure producing device 54 and these brake cylinders 42FL, FR, 52RL, RR. The components such as the hydraulic-pressure producing device 54 are controlled by a brake ECU 56 constituted mainly by a computer.

Also the vehicle is equipped with a hybrid ECU 58. The hybrid ECU 58, the brake ECU 56, the engine ECU 18, the motor ECU 28, and the power-source monitoring unit 34 are communicable with one another to transmit and receive information as needed.

It is noted that the present hydraulic braking system is installable on not only the hybrid vehicles but also electric cars and fuel-cell vehicles, for example. The electric cars are not equipped with the internal-combustion drive device 8. In the fuel-cell vehicles, the drive motor is driven by a fuel cell stack, for example.

The present hydraulic braking system is also installable on internal combustion vehicles. The internal combustion vehicles are not equipped with the electric drive device 6. In such vehicles, the regenerative braking force is not applied to the drive wheels 4FL, FR, so that a regenerative cooperative control is not executed.

<Structure of Hydraulic Braking System>

In the hydraulic braking system shown in FIG. 2, the hydraulic-pressure producing device 54 includes (i) a brake pedal 64 as a brake operating member, (ii) a cylinder device 66, and (iii) a rear-hydraulic-pressure control device 68 configured to control hydraulic pressure in a rear chamber 136 of the cylinder device 66.

[Cylinder Device]

The cylinder device 66 includes (a) a housing 100 and (b) pressurizing pistons 102, 104 and an input piston 106 that are arranged in a line and fluid-tightly and slidably fitted in a cylinder bore formed in the housing 100.

Pressure chambers 110, 112 are defined in front of the respective pressurizing pistons 102, 104. The brake cylinders 42FL, FR of the hydraulic brakes 40FL, FR for the respective front left and right wheels 4FL, FR are hydraulically coupled to the pressure chamber 110 via a liquid passage 114, while the brake cylinders 52RL, RR of the hydraulic brakes 50RL, RR for the respective rear left and right wheels 46RL, RR are hydraulically coupled to the pressure chamber 112 via a liquid passage 116. These hydraulic brakes 40FL, FR, 50RL, RR are activated by the hydraulic pressure in the brake cylinders 42FL, FR, 52RL, RR to restrain rotations of the respective wheels 4FL, FR, 46RL, RR.

A return spring 118 is disposed between the pressurizing piston 102 and the housing 100, and a return spring 120 is disposed between the two pressurizing pistons 102, 104. These springs 118, 120 respectively urge the pressurizing pistons 102, 104 in their backward direction. When the pressurizing pistons 102, 104 are located at their respective back end positions, the pressure chambers 110, 112 communicate with a reservoir 122 via reservoir ports 121a, b, respectively.

The pressurizing piston 104 includes (a) a front piston portion 126 provided at a front portion of the pressurizing piston 104, (b) an intermediate large-diameter portion 128 (may be also referred to as "intermediate piston portion") provided at an intermediate portion of the pressurizing piston 104 and projecting in a radial direction of the pressurizing piston 104, and (c) a rear small-diameter portion 130 having the diameter smaller than that of the intermediate large-diameter portion 128 and provided at a rear portion of the pressurizing piston 104 so as to extend parallel to an axis L. The front piston portion 126 and the intermediate large-diameter portion 128 are fluid-tightly and slidably fitted in the housing 100. The pressure chamber 112 is defined in front of the front piston portion 126, and an annular chamber 132 is defined in front of the intermediate large-diameter portion 128.

An annular inner protruding portion 134 is provided on an inner face of the housing 100. The pressurizing piston 104 is fluid-tightly and slidably fitted in this inner protruding portion 134 at a rear of the intermediate large-diameter portion 128, that is, the rear small-diameter portion 130 is fluid-tightly and slidably fitted in the inner protruding portion 134. This design forms the rear chamber 136 between the intermediate large-diameter portion 128 and the inner protruding portion 134 at a rear of the intermediate large-diameter portion 128.

The input piston 106 is disposed at a rear of the pressurizing piston 104 (specifically, the rear small-diameter portion 130), and a transmission chamber 140 is defined between the input piston 106 and the rear small-diameter portion 130. The input piston 106 is linked at its rear portion with the brake pedal 64 by using an operating rod 142 and other components. The transmission chamber 140 communicates with the reservoir 122 when the input piston 106 is located at its back end position.

The annular chamber 132 and the transmission chamber 140 are hydraulically coupled to each other via a liquid passage 150 on which is provided a normally-closed solenoid valve, namely, a lock valve 152. A portion of the liquid passage 150 which is nearer to the annular chamber 132 than to the lock valve 152 is hydraulically coupled to the reservoir 122 via a reservoir passage 154. Provided on the reservoir passage 154 is a normally-open solenoid valve, namely, an open valve 156.

A stroke simulator 160 is connected to the liquid passage 150. The stroke simulator 160 includes (a) a simulator piston 162 fitted in the housing so as to be movable relatively to each other, (b) a spring 164 provided between the housing and the simulator piston 162, and (c) a simulator chamber 166 provided on an opposite side of the simulator piston 162 from the spring 164. The annular chamber 132 and the transmission chamber 140 are hydraulically coupled to the simulator chamber 166 via the liquid passage 150. The stroke simulator 160 is operated by hydraulic pressure in the annular chamber 132 and the transmission chamber 140.

The hydraulic pressure in the annular chamber 132 and the transmission chamber 140 is determined depending on an operating force of the brake pedal 64. In this sense, a hydraulic sensor 170 for detecting the hydraulic pressure in the annular chamber 132 may be referred to as "operating-force sensor". Also, since the hydraulic pressure in the annular chamber 132 and the transmission chamber 140 applies a reaction force to the brake pedal 64, the hydraulic sensor 170 may also be referred to as "reaction force sensor".

[Rear-Hydraulic-Pressure Control Device]

The rear-hydraulic-pressure control device 68 is hydraulically coupled to the rear chamber 136.

The rear-hydraulic-pressure control device 68 includes (a) a high pressure source 180, (b) a regulator 182, and (c) an input-hydraulic-pressure control valve device 184.

The high pressure source 180 includes: a pump device 190 with a pump 186 and a pump motor 188; and an accumulator 192 for receiving working fluid or brake fluid discharged from the pump 186 and accumulating it in a pressurized state. Hydraulic pressure of the brake fluid accumulated in the accumulator 192 is called an accumulator pressure that is detected by an accumulator pressure sensor 194. The pump motor 188 is controlled such that this accumulator pressure is kept within a predetermined range.

The regulator 182 includes (d) a housing 200 and (e) a pilot piston 202 and a control piston 204 provided in the housing 200 so as to be arranged in a line in a direction parallel to the axis L.

The housing 200 has a stepped cylinder bore formed therein, and this cylinder bore has a large diameter portion and a small diameter portion. The pilot piston 202 is fluid-tightly and slidably fitted in the large diameter portion, and the control piston 204 is also fitted in the large diameter portion fluid-tightly and slidably by sealing portions 205a, b. Defined in the small diameter portion is a high pressure chamber 206 hydraulically coupled to the high pressure source 180. It is noted that the housing 200 may be constituted by a single component or a plurality of components.

A pilot pressure chamber 210 is defined between the pilot piston 202 and the housing 200, an input chamber 212 is defined between the pilot piston 202 and the control piston 204, and a servo pressure chamber 214 as one example of an output chamber is defined between the control piston 204 and a step of the cylinder bore formed, between the large diameter portion and the small diameter portion. A high-pressure supply valve 216 is provided between the servo pressure chamber 214 and the high pressure chamber 206.

The housing 200 contains a seat member 222 including a seat 220. The high-pressure supply valve 216 includes (f) this seat 220, (g) a body 224 movable so as to be seated against or spaced apart from the seat 220, and (h) a spring 226 provided between the body 224 and the housing 200 to urge the body 224 in a direction in which the body 224 is to be seated against the seat 220 (i.e., in its backward direction).

Formed in a central portion of a main body of the control piston 204 are a fitting bore extending parallel to the axis L and a liquid passage 232 extending in a direction perpendicular to the axis L (i.e., in a radial direction of the control piston 204) so as to communicate with the fitting bore. The liquid passage 232 is provided at a position where the liquid passage 232 always communicates with a low pressure port 238 formed in the housing 200. A valve opening member 234 extending parallel to the axis L is fitted in the fitting bore. A central portion of the valve opening member 234 has a through hole 236 extending parallel to the axis L. One end portion of the through hole 236 is open to the liquid passage 232 while the other end portion of the through hole 236 faces the body 224. As a result, the end portion of the valve opening member 234 which faces the body 224 and the low pressure port 238 are hydraulically coupled to each other via the through hole 236 and the liquid passage 232, so that the through hole 236 and the liquid passage 232 constitute a low-pressure-port communication passage 239.

A spring 240 is provided between the valve opening member 234 and the seat member 222, and this spring 240 urges the valve opening member 234 and the main body of the control piston 204 in the backward direction.

As thus described, the control piston 204 including the valve opening member 234 has a generally stepped shape, and the input chamber 212 is defined at a rear of a large diameter portion of the control piston 204 while the servo pressure chamber 214 is defined in front of a step formed between the large diameter portion and a small diameter portion of the control piston 204. Thus, the control piston 204 can act as a pressurization piston for raising hydraulic pressure in the servo pressure chamber 214 with respect to hydraulic pressure in the input chamber 212.

It is noted that a spring 241 is provided between the seat member 222 and the housing 200 to position the seat member 222 relative to the housing 200.

The liquid passage 116 is connected to the pilot pressure chamber 210. Thus, hydraulic pressure in the pressure chamber 112 of the cylinder device 66 acts on the pilot piston 202.

The rear chamber 136 of the cylinder device 66 is connected to the servo pressure chamber 214 via a servo passage 242. The hydraulic pressure in the servo pressure chamber 214, called servo hydraulic pressure, is supplied to the rear chamber 136 to activate the cylinder device 66. The servo hydraulic pressure is detected by a servo-hydraulic-pressure sensor 243. As shown in FIG. 2, the servo pressure chamber 214 and the rear chamber 136 are directly connected to each other, and accordingly the hydraulic pressure in the servo pressure chamber 214 is normally equal in magnitude to the hydraulic pressure in the rear chamber 136.

The reservoir 122 is hydraulically coupled to the low pressure port 238 via a reservoir passage 244.

Connected to the input chamber 212 is the input-hydraulic-pressure control valve device 184 including a pressurization linear control valve (SLA) 250 and a pressure-reduction linear control valve (SLR) 252, and the hydraulic pressure in the input chamber 212, called input hydraulic pressure Pin, is controlled by the pressurization linear control valve 250 and the pressure-reduction linear control valve 252. The pressurization linear control valve 250 is provided between the input chamber 212 and the high pressure source 180, and the pressure-reduction linear control valve 252 is provided between the input chamber 212 and the reservoir 122.

Figure 3A:
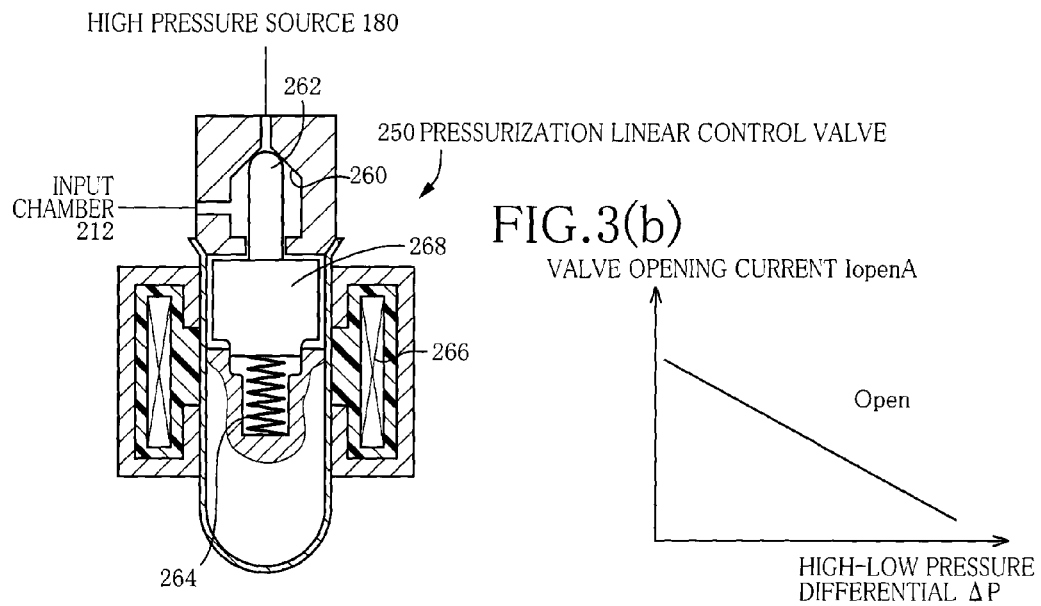

As shown in FIG. 3(a), the pressurization linear control valve 250 includes: a seating valve member including (1) a seat 260, (2) a body 262, and (3) a spring 264 applying an urging force Fs in a direction in which the body 262 is to be seated against the seat 260; and a solenoid including (4) a coil 266 and (5) a plunger 268 holding the body 262 and movable toward and away from the housing.

The pressurization linear control valve 250 is a normally-closed solenoid control valve that is in its closed state when no current is delivered to the coil 266. This pressurization linear control valve 250 is provided in an orientation in which a pressure differential force Fp related to a pressure differential between hydraulic pressure in the high pressure source 180 (i.e., the accumulator pressure detected by the accumulator pressure sensor 194) and the hydraulic pressure in the input chamber 212 (i.e., a high-low pressure differential that is a pressure differential between the high pressure side and the low pressure side) acts in a direction in which the body 262 is moved away from the seat 260. When a current is supplied to the coil 266, an electromagnetic motive force Fd acts on the plunger 268 in the direction in which the body 262 is moved away from the seat 260.

As thus described, the pressure differential force Fp, the urging force Fs of the spring 264, and the electromagnetic motive force Fd act on the pressurization linear control valve 250, and a relationship among these forces is represented as Equation (11).

$$Fd+Fp=Fs \tag{11}$$

Figure 3B:
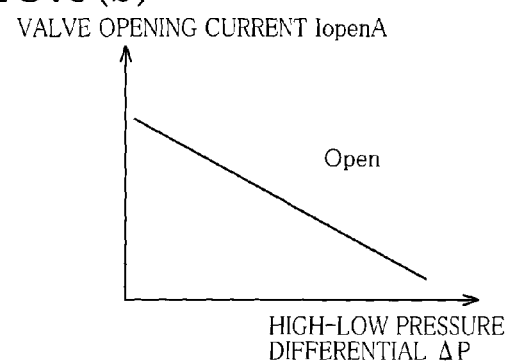

Equation (11) shows that, assuming that the urging force Fs of the spring 264 is generally constant, the body 262 can be moved off the seat 260 even if the electromagnetic motive force Fd is small in the case where the pressure differential force Fp is large. Thus, it can be seen that as shown in FIG. 3(b) a valve opening current IopenA is smaller in the case where the high-low pressure differential in the pressurization linear control valve 250 is large than in the case where the high-low pressure differential in the pressurization linear control valve 250 is small.

Figure 3C:
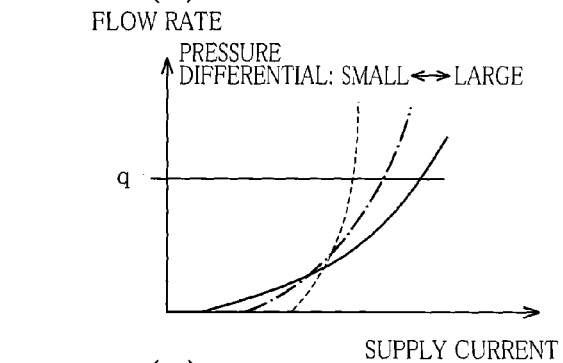

Also, as shown in FIG. 3(c), a relationship between the supply current and a flow rate or quantity is obtained by experiments or the like in advance and stored. FIG. 3(c) shows that in the case where the pressure differential force Fp is constant (that is, the high-low pressure differential is constant), the flow rate increases with the increase in the supply current. In addition, the valve opening current IopenA is larger and the electromagnetic motive force has greater effect on a determination of the flow rate in the case where the high-low pressure differential is small than in the case where the high-low pressure differential is large. This leads to the estimation that an increase gradient of the flow rate with respect to the increase in the supply current is larger in the case where the pressure differential is small than in the case where the pressure differential is large.

Figure 3D:
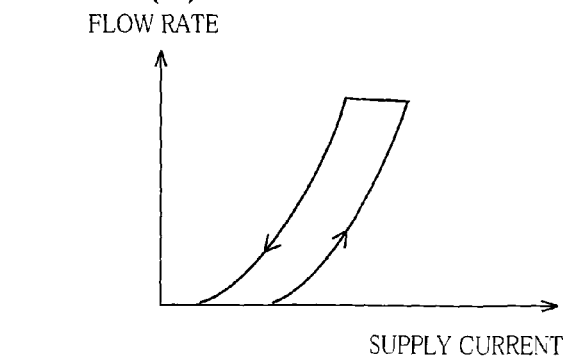

Also, the relationship between the supply current and the flow rate exhibits a hysteresis as shown in FIG. 3(d). Thus, the pressurization linear control valve 250 is kept in the open state even where a smaller supply current is applied to the pressurization linear control valve 250 being in the open state by supply of current larger than the valve opening current to the coil 266.

Figure 4A:
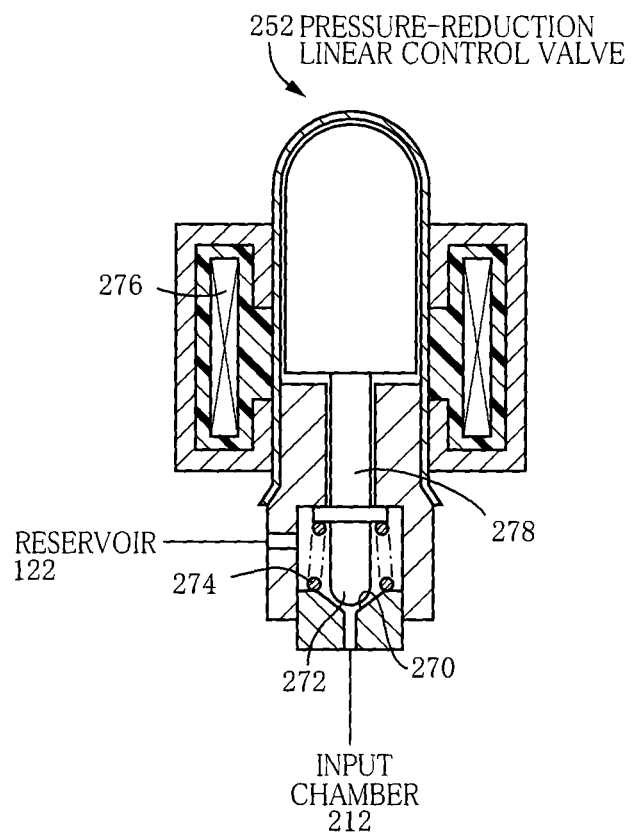

As shown in FIG. 4(a), the pressure-reduction linear control valve 252 includes: a seating valve member including (1) a seat 270, (2) a body 272, and (3) a spring 274 applying the urging force Fs in a direction in which the body 272 is moved away from the seat 270; and a solenoid including (4) a coil 276 and (5) a plunger 278 holding the body 272 and movable toward and away from the housing. The pressure-reduction linear control valve 252 is a normally-open solenoid control valve that is in its open state when no current is delivered to the coil 276. This pressure-reduction linear control valve 252 is provided between the input chamber 212 and the reservoir 122 in an orientation in which a pressure differential force Fp related to a high-low pressure differential (that is obtained by subtracting hydraulic pressure in the reservoir 122 (i.e., atmospheric pressure) from the hydraulic pressure in the input chamber 212 and that corresponds to the hydraulic pressure in the input chamber 212) acts in the direction in which the body 272 is moved away from the seat 270. When current is supplied to the coil 276, an electromagnetic motive force Fd acts on the plunger 278 in a direction in which the body 272 is to be seated against the seat 270.

As thus described, the pressure differential force Fp, the urging force Fs of the spring 274, and the electromagnetic motive force Fd act on the pressure-reduction linear control valve 252, and a relationship among these forces is represented as Equation (12).

$$Fp+Fs=Fd \quad (12)$$

Figure 4B:
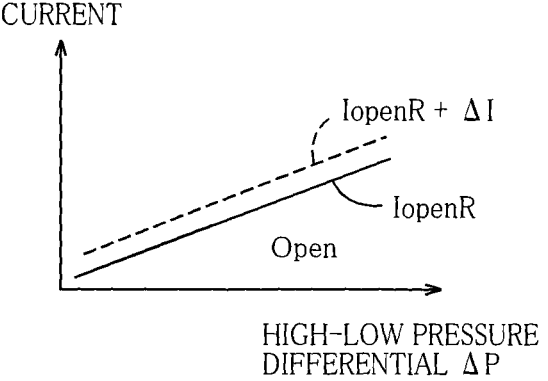

Equation (12) shows that, assuming that the urging force Fs of the spring 274 is constant, as shown in FIG. 4(b) a valve opening current IopenR is larger in the case where the high-low pressure differential (i.e., the hydraulic pressure in the input chamber 212) is large than in the case where the high-low pressure differential is small. The pressure-reduction linear control valve 252 is in the open state when the supply current is smaller than the valve opening current IopenR. Also, in the case where the pressure-reduction linear control valve 252 is in the closed state by the supply of the constant current, when the hydraulic pressure in the input chamber 212 becomes higher than hydraulic pressure determined based on the current and a table in FIG. 4(b), the pressure-reduction linear control valve 252 is switched from the closed state to the open state. Accordingly, the pressure-reduction linear control valve 252 can be used as a pressure-differential control valve in the form of a relief valve.

Sensors connected to the brake ECU 56 include the operating-force sensor 170, the accumulator pressure sensor 194, the servo-hydraulic-pressure sensor 243, and a stroke sensor 280 for detecting a stroke of the brake pedal 64. Also, components connected to the brake ECU 56 include the slip control device 55, the lock valve 152, a reservoir communication valve 156, the pressurization linear control valve 250, and the pressure-reduction linear control valve 252. A storage portion of the brake ECU 56 stores various tables and programs, for example.

<Operation of Hydraulic Braking System>

When the hydraulic braking system is under normal conditions, the regenerative cooperative control is executed in which an open state of the lock valve 152 and a closed state of the reservoir communication valve 156 are established. This provides communication between the transmission chamber 140 and the annular chamber 132 and communication between the transmission chamber 140 and the simulator chamber 166 and disconnects the transmission chamber 140 and the annular chamber 132 from the reservoir 122.

When the brake pedal 64 is depressed, the input piston 106 is advanced relative to the pressurizing piston 104, causing the brake fluid in the transmission chamber 140 to flow to the simulator chamber 166, which activates the stroke simulator 160.

The annular chamber 132, the transmission chamber 140, and the simulator chamber 166 communicate with one another. Thus, hydraulic pressures in these chambers are equal to one another. Also, the area of a pressure receiving surface of the intermediate large-diameter portion 128 which faces the annular chamber 132 is equal to the area of a pressure receiving surface of the rear small-diameter portion 130 which faces the transmission chamber 140. Therefore, a forward force (i.e., a force in a forward direction) acting on the rear small-diameter portion 130 and a backward force (i.e., a force in the backward direction) acting on the intermediate large-diameter portion 128 are balanced with each other in the pressurizing piston 104, thereby inhibiting the pressurizing piston 104 from advancing. As a result, the input piston 106 is advanced relative to the pressurizing piston 104.

When the regenerative braking force is enough for (i.e., equal to or greater than) a total requested braking force that is a force requested by a driver (e.g., determined based on an operating state including at least one of the stroke and the operating force of the brake pedal 64), the hydraulic pressure is not supplied to the rear chamber 136, so that the hydraulic pressure is not produced in the front pressure chambers 110, 112.

On the other hand, when the regenerative braking force is not enough for (i.e., less than) the total requested braking force, the hydraulic pressure is supplied to the rear chamber 136. The supplied hydraulic pressure advances the pressurizing pistons 104, 102, so that the hydraulic pressure is produced in the front pressure chambers 110, 112 and supplied to the brake cylinders 52, 42. As described above, the hydraulic pressure in the transmission chamber 140 and the hydraulic pressure in the annular chamber 132 are balanced with each other in the pressurizing piston 104. Thus, the pressurizing piston 104 is advanced by the forward force related to the hydraulic pressure in the rear chamber 136, and hydraulic pressure related to the hydraulic pressure in the rear chamber 136 is produced in the front pressure chambers 110, 112.

Figure 5A:
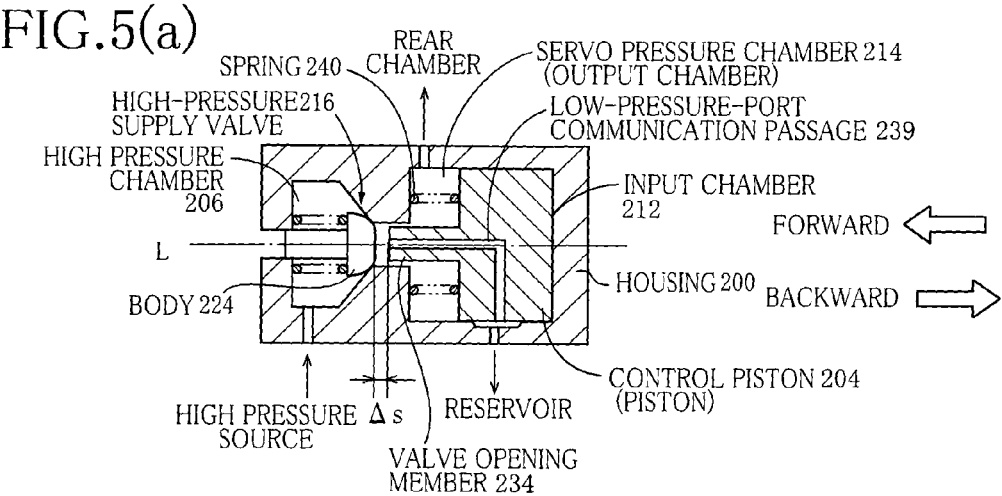
FIGS. 5(a)-5(c) are views for explaining operations of a regulator of the hydraulic braking system.
Figure 5B:
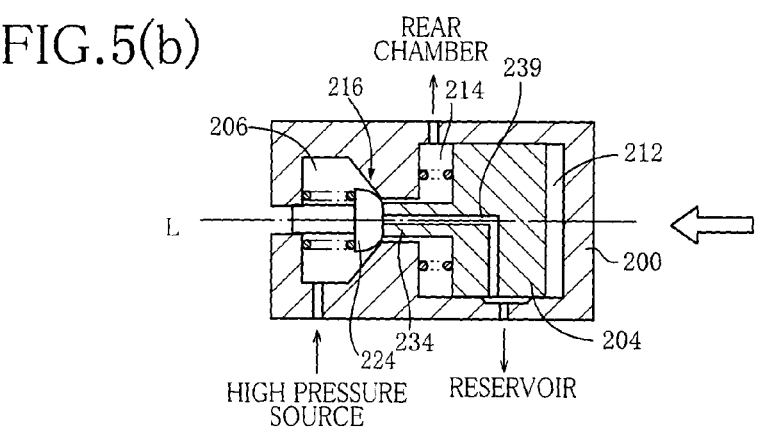
Figure 5C:
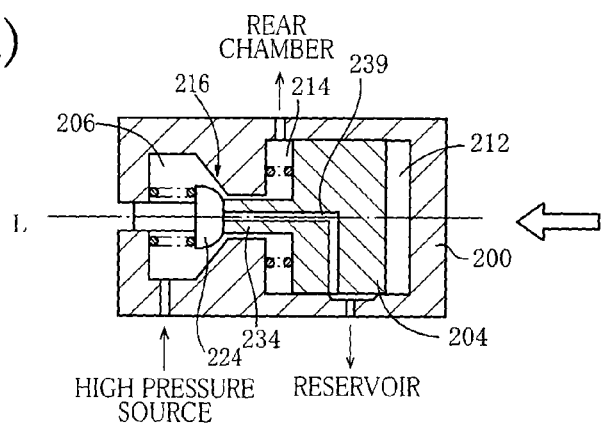

The hydraulic pressure in the rear chamber 136, namely, servo hydraulic pressure Psv is controlled by the rear-hydraulic-pressure control device 68. There will be next explained an operation of the regulator 182 with reference to FIGS. 5(a)-5(c). FIG. 5 schematically and simply illustrates the construction of the regulator 182 for the clarity of its operation.

When the control piston 204 is located at the back end position as shown in FIG. 5(a), the valve opening member 234 is located at a rear of the body 224 by an idle stroke Δs. The servo pressure chamber 214 communicates with the reservoir 122 via the low-pressure-port communication passage 239 and the reservoir passage 244 so that actual hydraulic pressure in the servo pressure chamber 214, namely, the servo hydraulic pressure (or output hydraulic pressure) Psv is the atmospheric pressure.

When the forward force applied to the control piston 204 becomes greater than an urging force Fsb of the spring 240 with an increase in the input hydraulic pressure Pin as the hydraulic pressure in the input chamber 212, the control piston 204 is advanced. As a result, as shown in FIG. 5(b), the valve opening member 234 is brought into contact with the body 224, disconnecting the servo pressure chamber 214 from the reservoir 122. This position of the control piston 204 may be referred to as "disconnecting position".

The control piston 204 is acted by (i) a force (Pin·Ain) obtained by multiplying the input hydraulic pressure Pin by an area Ain of the pressure receiving surface facing the input chamber 212 and (ii) a force (Psv·Asv) obtained by multiplying the servo hydraulic pressure Psv by an area Asv of the pressure receiving surface facing the servo pressure chamber 214, and (iii) the urging force Fsb of the spring 240. Since the spring constant of the spring 240 is small, the urging force Fsb can be regarded as approximately constant (i.e., a force corresponding to the set load). Thus, Equation (13) is provided for the control piston 204.

$$Pin \cdot Ain = Psv \cdot Asv + Fsb \quad (13)$$

As shown in FIG. 5(c), when the control piston 204 is advanced with a further increase in the input hydraulic pressure Pin, the valve opening member 234 moves the body 224 off the seat 220, establishing the open state of the high-pressure supply valve 216. As a result, the servo pressure chamber 214 and the high pressure chamber 206 communicate with each other, thereby raising the servo hydraulic pressure Psv.

In view of the above, it is possible to consider that components such as the high-pressure supply valve 216, the valve opening member 234, and the low-pressure-port communication passage 239 constitute an output-hydraulic-pressure control valve device. The output-hydraulic-pressure control valve device selectively establishes one of the communication between the servo pressure chamber 214 and the high pressure source 180 and the communication between the servo pressure chamber 214 and the reservoir 122, which raises or reduces the hydraulic pressure in the servo pressure chamber 214.

In the present embodiment, a target value Pref of the rear chamber 136 is equal to target servo hydraulic pressure Psvref (Pref=Psvref). Also, target input hydraulic pressure Pinref is determined based on the target servo hydraulic pressure Psvref and a relationship between the servo hydraulic pressure Psv and the input hydraulic pressure Pin, and the input hydraulic pressure Pin is estimated based on the servo hydraulic pressure Psv detected by the servo-hydraulic-pressure sensor 243 and the relationship between the servo hydraulic pressure Psv and the input hydraulic pressure Pin. The pressurization linear control valve 250 and the pressure-reduction linear control valve 252 are controlled such that the input hydraulic pressure Pin is brought closer to the target input hydraulic pressure Pinref, whereby the servo hydraulic pressure Psv is brought closer to the target servo hydraulic pressure Psvref, and the hydraulic pressure in the rear chamber 136 is brought closer to the target value Pref. The control for bringing the input hydraulic pressure Pin closer to the target input hydraulic pressure Pinref may be referred to as "normal control".

In the case where the regenerative cooperative control is executed, the target value Pref of the rear chamber 136 is determined such that the regenerative braking force and the hydraulic braking force are enough for the total requested braking force determined by the operating state of the brake pedal 64 by the driver. On the other hand, in the case where the regenerative cooperative control is not executed, the target value Pref is determined in most cases such that the hydraulic braking force is not enough for the total requested braking force.

It is noted that since it is considered that a servo-hydraulic-pressure deviation obtained by subtracting the actual servo hydraulic pressure Psv from the target servo hydraulic pressure Psvref is equal to an input-hydraulic-pressure deviation obtained by subtracting the actual input hydraulic pressure Pin from the target input hydraulic pressure Pinref, each of these deviations will be hereinafter collectively and simply referred to as "deviation e".

[Normal Control]

Figure 6:
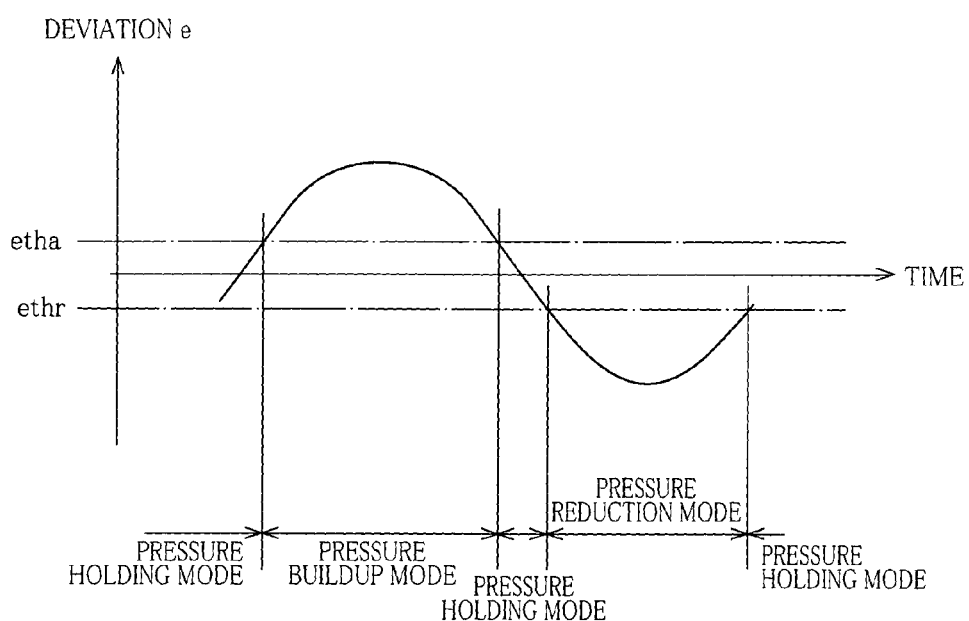
FIG. 6 is a map representing a control-mode determination table stored in a storage portion of a brake ECU of the hydraulic braking system.

In the normal control, a control mode is determined according to a mode determination table shown in FIG. 6.

When the deviation e is greater than a pressurization threshold value etha, a pressure buildup mode is established. In this mode, the pressurization linear control valve 250 is controlled to build up or increase the hydraulic pressure in the input chamber 212, with the pressure-reduction linear control valve 252 being in the closed state.

A supply current IA supplied to the pressurization linear control valve 250 is determined as a value (i.e., a magnitude) obtained by adding a feedback current IFB to the valve opening current IopenA.

$$IA = IopenA + IFB \quad (14)$$

The feedback current IFB can be determined as a value obtained by multiplying the deviation e by a feedback coefficient KA, for example.

$$IFB = KA \cdot e$$

A supply current IR supplied to the pressure-reduction linear control valve 252 is determined to have a magnitude allowing the pressure-reduction linear control valve 252 to be kept in the closed state even when the target input hydraulic pressure Pinref, or a pressure differential force determined by the input hydraulic pressure Pin at that point in time is applied to the pressure-reduction linear control valve 252. For example, as indicated by the broken line in FIG. 4(b), the supply current IR can be determined such that a current larger than the valve opening current by a set value is supplied.

$$IR = IopenR + \Delta I \quad (15)$$

When the deviation e is less than a pressure-reduction threshold value ethr, a pressure reduction mode is established. In this mode, the pressure-reduction linear control valve 252 is controlled to reduce the hydraulic pressure in the input chamber 212, with the pressurization linear control valve 250 being in the closed state.

In the pressure reduction mode, the supply current IA supplied to the pressurization linear control valve 250 is less than the valve opening current by the set value. The high-low pressure differential can be obtained, for example, as a value obtained by subtracting the input hydraulic pressure Pin or the target input hydraulic pressure Pinref from a value detected by the accumulator pressure sensor 194.

$$IA = IopenA - \Delta I \quad (16)$$

It is noted that the supply current IA supplied to the pressurization linear control valve 250 can be determined as zero.

The supply current IR supplied to the coil 276 of the pressure-reduction linear control valve 252 is determined, for example, as a value obtained by subtracting the feedback current IFB from a valve opening current IoepnR. The feedback current IFB can be determined as a value obtained by multiplying the deviation e by a feedback coefficient KR.

$$IR = IopenR - IFB \quad (17)$$

$$IFB = KR \cdot e$$

When the deviation e is equal to or less than the pressurization threshold value etha and equal to or greater than the pressure-reduction threshold value ethr, a pressure holding mode is established. In this mode, each of the pressurization linear control valve 250 and the pressure-reduction linear control valve 252 is in the closed state. For example, the supply current IA supplied to the pressurization linear control valve 250 is determined to have a magnitude determined according to Equation (16), and the supply current IR supplied to the pressure-reduction linear control valve 252 is determined to have a magnitude determined according to Equation (15).

[Operation Start Control]

As described above, on the other hand, the control piston 204 is located at the back end position in a non-operating state of the regulator 182, so that the servo pressure chamber 214 and the reservoir 122 are in communication with each other. Thus, even in the case of a request for operating the hydraulic brakes 40, 50 (i.e., a request for the hydraulic pressure), the hydraulic pressure cannot be produced immediately in the servo pressure chamber 214, causing delay in activation.

To solve this problem, when the hydraulic pressure is requested, that is, when the operation of the regulator 182 is started, an operation start control that differs from the normal control is executed in the present embodiment.

The operation start control includes: a "space eliminating processing (step)" performed when the servo hydraulic pressure Psv is equal to or lower than a first set pressure Pth1; and a "pulsation damping processing (step)" performed when the servo hydraulic pressure Psv is higher than the first set pressure Pth1 and equal to or lower than a second set pressure Pth2.

The space eliminating processing is a processing for speedily advancing the control piston 204 from the back end position to the disconnecting position. In this space eliminating processing, the brake fluid is supplied to the input chamber 212 at a set flow rate q.

The first set pressure Pth1 is determined to have a magnitude that can advance the control piston 204 so that the servo pressure chamber 214 is considered to be disconnected from the reservoir 122. In other words, a first set input hydraulic pressure that is the hydraulic pressure in the input chamber 212 which corresponds to the first set pressure Pth1 in the servo pressure chamber 214 is determined to have a magnitude determined based on a lowermost value of hydraulic pressure that can advance the control piston 204. For example, the magnitude may be the lowermost value of the hydraulic pressure or a value close to the lowermost value and greater than the lowermost value (e.g., the lowermost value+ the set value). Also, the magnitude may be determined based on a set load of the return spring 240.

In the present embodiment, a target time tref for which the servo hydraulic pressure Psv is increased to the first set pressure Pth1 based on, e.g., a target servo hydraulic pressure Pref and/or an increase gradient dPref of the target servo hydraulic pressure. As one example, the target time tref is shorter in the case where the target servo hydraulic pressure Pref is large than in the case where the target servo hydraulic pressure Pref is small. As another example, the target time tref is shorter in the case where the increase gradient dPref of the target servo hydraulic pressure is large than in the case where the increase gradient dPref is small.

A fluid quantity Q required for the control piston 204 to be advanced from the back end position to the disconnecting position is determined by the idle stroke Δs and an area of the control piston 204 which receives the pressure from the input chamber 212, but this fluid quantity Q is known. The set flow rate q (cc/sec) is obtained by dividing the fluid quantity Q (cc) by the target time tref (sec).

In the space eliminating processing, the supply current IA supplied to the pressurization linear control valve 250 is determined as the sum of the valve opening current IopenA and a flow rate current Iq.

$$IA = IopenA + Iq$$

The valve opening current IopenA is determined based on the table in FIG. 3(b), and the flow rate current Iq is determined based on the table in FIG. 3(c). The flow rate current Iq is a current that can maintain the set flow rate q. As shown in FIG. 3(c), in a case where the set flow rate q is relatively high, the flow rate current Iq is larger in the case where the high-low pressure differential is large than in the case where the high-low pressure differential is small. As the high-low pressure differential, a value obtained by subtracting the input hydraulic pressure Pin from the accumulator pressure can be used, for example.

As shown in FIG. 3(d), the relationship between the supply current and the flow rate exhibits hysteresis. Thus, after the pressurization linear control valve 250 is changed to the open state, even where the supply current is reduced, the flow rate can be maintained. Therefore, the flow rate current Iq can be reduced with consideration of the hysteresis after the start of the space eliminating processing.

The supply current IR supplied to the pressure-reduction linear control valve 252 is determined to have a magnitude in which the pressure-reduction linear control valve 252 is changed to the open state when the input hydraulic pressure Pin exceeds a first input set pressure (corresponding to the first set pressure Pth1 for the servo hydraulic pressure Psv). The supply current IR can be determined based on the table in FIG. 4(b) as a value close to the valve opening current IopenR in the case where the high-low pressure differential is the first input set pressure. This determination of the supply current for the pressure-reduction linear control valve 252 allows the servo hydraulic pressure Psv to be built up to the first set pressure Pth1 and not to exceed the first set pressure Pth1.

The pulsation damping processing is a processing for damping or restraining pulsation due to sharp and abrupt advance of the pressurizing pistons 104, 102. In this pulsation damping processing, the input flow rate of the brake fluid supplied to the input chamber 214 is reduced for the duration of time that the hydraulic pressure in the servo pressure chamber 214 reaches the second set pressure Pth2.

When the brake fluid is supplied from the servo pressure chamber 214 to the rear chamber 136, and the forward force applied to the pressurizing piston 104 depending upon the hydraulic pressure in the rear chamber 136 exceeds set loads of the return springs 120, 118, the pressurizing pistons 104, 102 are advanced to close or shut the reservoir ports 121a, b, so that the hydraulic pressure is produced in the front pressure chambers 110, 112.

When the brake fluid is supplied in this state from the servo pressure chamber 214 to the rear chamber 136 at a relatively large flow rate, the hydraulic pressure in the rear chamber 136 rises, causing abrupt advance of the pressurizing pistons 104, 102. As a result, the reservoir ports 121a, b are changed to the closed state, and the hydraulic pressure in the front pressure chambers 112, 110 sharply increases. Also, the hydraulic pressure in the rear chamber 136 sharply increases, causing a sharp increase in the servo hydraulic pressure Psv. This moves the control piston 204 backward, which transiently lowers the servo hydraulic pressure Psv sharply and accordingly lowers the hydraulic pressure in the rear chamber 136 sharply, causing the pulsation. This pulsation causes operating noises.

However, where the flow rate of the brake fluid supplied from the servo pressure chamber 214 to the rear chamber 136 is restrained or reduced until the reservoir ports 121a, b are changed to the closed state, it is possible to damp the pulsation or restrain generation of the pulsation and accordingly reduce the operating noises due to the pulsation or restrain generation of the operating noises.

In view of the above, the second set pressure Pth2 may be the lowermost value of the hydraulic pressure in the rear chamber 136 which can advance the pressurizing pistons 104, 102 or a value close to and greater than the lowermost value (e.g., the lowermost value+a set value), for example. Also, the second set pressure Pth2 may be determined based on the set loads of the return springs 118, 120, for example.

In the pulsation damping processing, the supply current IA supplied to the pressurization linear control valve 250 is determined as a value close to the value close to the valve opening current IopenA.

$$IA = IopenA$$

The valve opening current IopenA is determined based on the high-low pressure differential and the table in FIG. 3(*b*).

Also, as shown in FIG. 3(*d*), the relationship between the supply current and the flow rate exhibits the hysteresis. Thus, as described above, the supply current IA can be reduced with consideration of the hysteresis.

The supply current IR supplied to the pressure-reduction linear control valve 252 may have a magnitude in which the pressure-reduction linear control valve 252 is changed to the open state when the input hydraulic pressure Pin exceeds a second input set pressure corresponding to the second set pressure Pth2 for the servo hydraulic pressure Psv, and the supply current IR can be obtained based on the second input set pressure and the table in FIG. 4(*b*).

As a result, the servo hydraulic pressure Psv can be built up to the second set pressure Pth2 and prevented from exceeding the second set pressure Pth2.

When the servo hydraulic pressure Psv becomes higher than the second set pressure Pth2, the normal control is executed.

As described above, one of the pressure buildup mode, the pressure holding mode, and the pressure reduction mode is determined based on the deviation e, and a feedback control is executed for the pressurization linear control valve 250 and the pressure-reduction linear control valve 252 in the determined mode so as to make the actual input hydraulic pressure Pin closer to the target input hydraulic pressure Pinref, so that the servo hydraulic pressure Psv is made closer to the target servo hydraulic pressure Psvref.

[Input-Hydraulic-Pressure Control Program]

Figure 7:
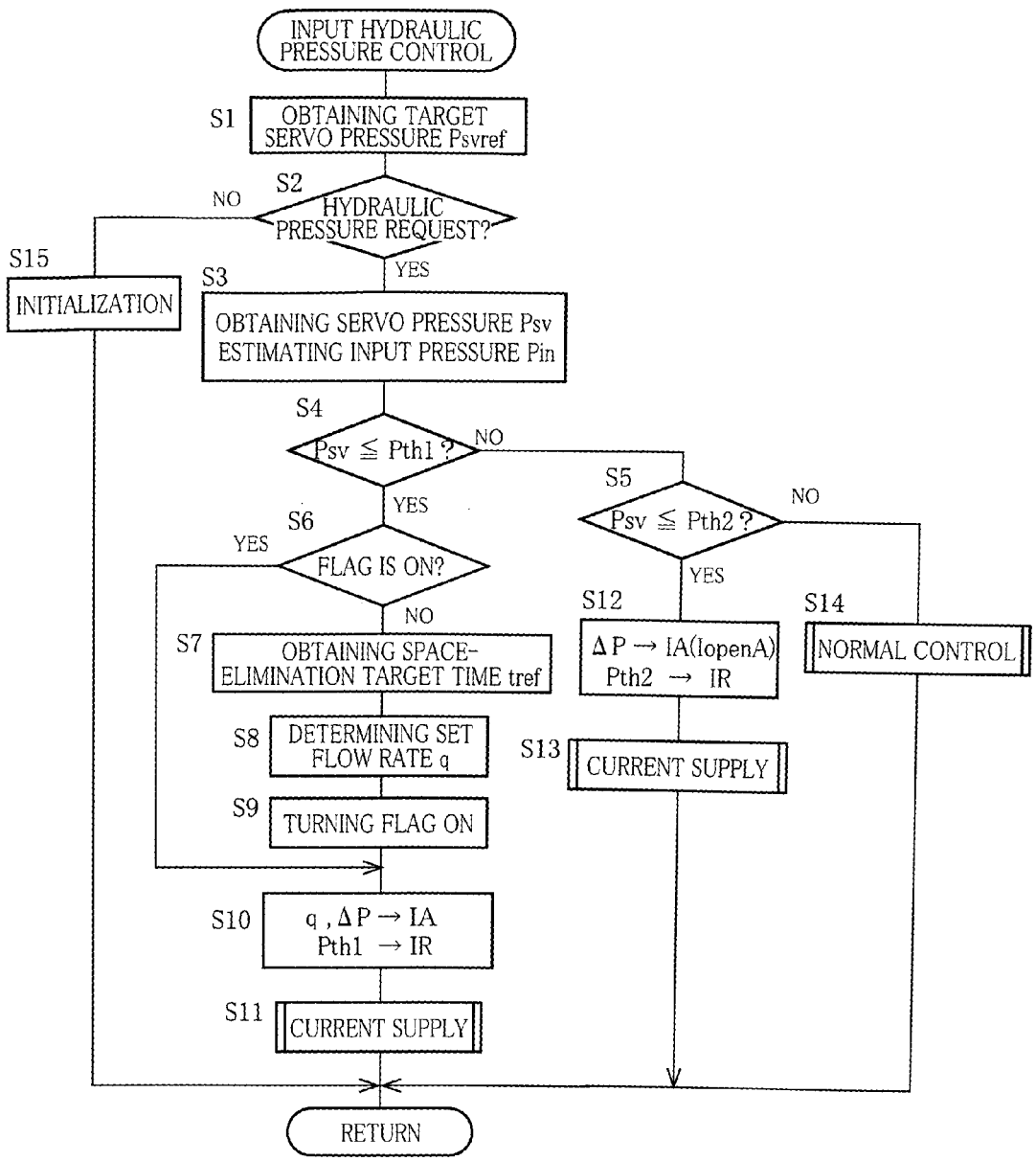
FIG. 7 is a flow chart representing an input-hydraulic-pressure control program stored in the storage portion.

The input-hydraulic-pressure control program indicated by the flow chart in FIG. 7 is executed every predetermined set time.

At step 1 ("step" is omitted where appropriate), the target servo hydraulic pressure Psvref is obtained, and it is determined at S2 whether the target servo hydraulic pressure Psvref is greater than zero or not, that is, whether there is a hydraulic pressure request or not. For example, when the regenerative cooperative control is executed, the target value of the hydraulic braking force is determined such that the regenerative braking force and the hydraulic braking force are enough for the total requested braking force, and the target servo hydraulic pressure Psvref is determined based on the determined target value.

When the target servo hydraulic pressure Psvref is greater than zero, it is determined that there is a hydraulic pressure request. At S3, the actual servo hydraulic pressure Psv is obtained, and the input hydraulic pressure Pin is estimated. At S4, it is determined whether or not the servo hydraulic pressure Psv is equal to or lower than the first set pressure Pth1, and it is determined at S5 whether or not the servo hydraulic pressure Psv is equal to or lower than the second set pressure Pth2.

When the servo hydraulic pressure Psv is equal to or lower than the first set pressure Pth1, the space eliminating processing is executed. When the servo hydraulic pressure Psv is higher than the first set pressure Pth1 and equal to or lower than the second set pressure Pth2, the pulsation damping processing is executed. When the servo hydraulic pressure Psv is higher than the second set pressure Pth2, the normal control is executed.

In the space eliminating processing, it is determined at S6 whether a flag is ON or not. The flag is turned ON when the set flow rate q is determined. Thus, when the processing at S6 is executed for the first time, the flag is OFF. In this case, the space-elimination target time tref is determined at S7, then at S8 the set flow rate q is determined by dividing the fluid quantity Q by the target time tref, and then at S9 the flag is turned ON. At S10, the supply current IA supplied to the pressurization linear control valve 250 and the supply current IR supplied to the pressure-reduction linear control valve 252 are determined, and at S11 the pressurization linear control valve 250 and the pressure-reduction linear control valve 252 are controlled.

When the present program is executed for the next time, the flag is ON, and accordingly the processings at S1-4, 6, 10, 11 are executed. When the servo hydraulic pressure Psv exceeds the first set pressure Pth1 after the processings at S1-4, 6, 10, 11 are repeated, a negative decision is made at S4 (S4: NO). In this case, since the servo hydraulic pressure Psv is equal to or lower than the second set pressure Pth2, a positive decision is made at S5 (S5: YES). Thus, the space eliminating processing is finished, and the pulsation damping processing is started.

At S12, 13, the supply current IA supplied to the pressurization linear control valve 250 and the supply current IR supplied to the pressure-reduction linear control valve 252 are determined and supplied. The processings at S1-5, 12, 13 are repeated until the servo hydraulic pressure Psv reaches the second set pressure Pth2. When the servo hydraulic pressure Psv exceeds the second set pressure Pth2, a negative decision is made at S5 (S5: NO). Thus, the pulsation damping processing is finished, that is, the operation start control is finished, and thereafter the normal control is executed at S14.

On the other hand, when the regenerative braking force is equal to or greater than the total requested braking force, for example, the target servo hydraulic pressure Psvref is set to zero, it is determined that there is no hydraulic pressure request. In this case, flags and parameters used in this program are initialized at S15.

Figure 8:
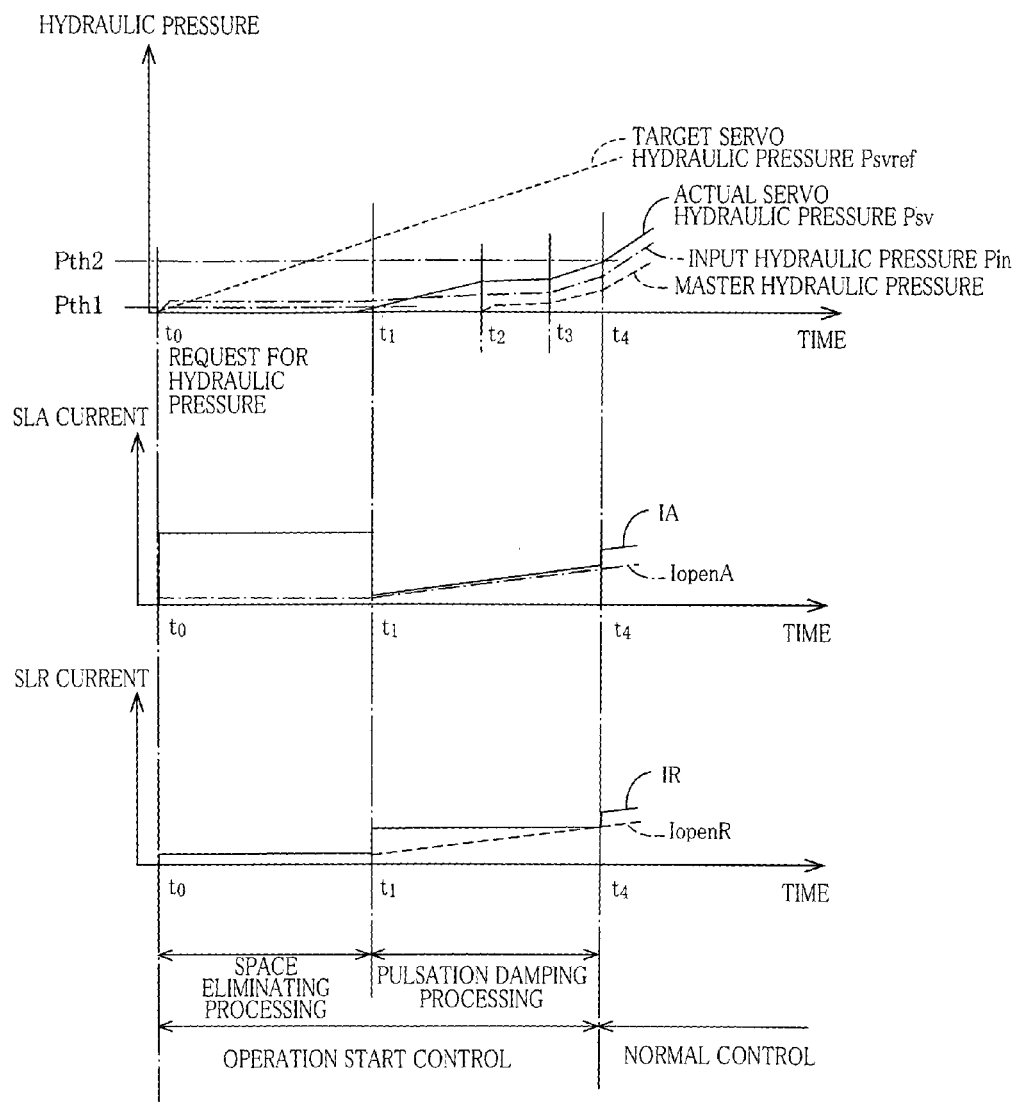
FIG. 8 is a view representing one example of a control according to the input-hydraulic-pressure control program.

There will be next explained a specific example of the control with reference to FIG. 8.

When the hydraulic pressure request is detected at time t0, the space eliminating processing of the operation start control is executed, so that the brake fluid is supplied to the input chamber 212 at the set flow rate q. Thus, the control piston 204 is speedily advanced, so that the servo pressure chamber 214 is disconnected from the reservoir 122.

When the servo hydraulic pressure Psv reaches the first set pressure Pth1 at time t1, the space eliminating processing is finished, and the pulsation damping processing is started. Since the supply current IA supplied to the pressurization linear control valve 250 is set at the value close to the valve opening current IopenA, the control piston 204 is advanced at a slow speed. The brake fluid is supplied from the servo pressure chamber 214 to the rear chamber 136 at a low flow rate.

At time t2, when the force related to the hydraulic pressure in the rear chamber 136 becomes greater than the set loads of the return springs 118, 120, the pressurizing pistons 102, 104 are advanced, and at time t3 the reservoir ports 121*a*, *b* are closed to raise the hydraulic pressure in the front pressure chambers 110, 112. At time t4, when the servo hydraulic pressure Psv reaches the second set pressure Pth2, the pulsation damping processing is finished, and thereafter the normal control is executed.

As thus described, the control piston 204 is speedily advanced in the space eliminating processing, the delay in activation of the hydraulic brakes 40, 50 can be reduced to improve the response.

Also, since the pressurizing pistons 102, 104 of the cylinder device 66 are advanced at a slow speed in the pulsation damping processing, it is possible to damp the pulsation or restrain generation of the pulsation and accordingly reduce the operating noises due to the pulsation or restrain generation of the operating noises.

Also, since the pressure-reduction linear control valve 252 is used as the pressure differential valve, the servo hydraulic pressure Psv can be prevented from becoming excessively high, making it possible to restrain vibrations due to, e.g., the noises.

In view of the above, elements such as portions of the brake ECU 56 which store and execute the input-hydraulic-pressure control program indicated by the flow chart in FIG. 7 and the input-hydraulic-pressure control valve device 184 are one example of an input-hydraulic-pressure control device. Elements such as portions of the input-hydraulic-pressure control device which store and execute the processings at S1-11 of the input-hydraulic-pressure control program are one example of a high-flow-rate supply unit. Elements such as portions of the high-flow-rate supply unit which store and execute the processings at S12, 13 are one example of a low-flow-rate supply unit.

Also, elements such as portions of the high-flow-rate supply unit which at S10, 11 determine the supply current for the pressure-reduction linear control valve 252 as a pressure-reduction control valve and supply the current to the pressure-reduction linear control valve 252 are one example of a first pressure-reduction-valve control unit.

Also, elements such as portions of the low-flow-rate supply unit which determine the supply current IR supplied to the pressure-reduction linear control valve 252 and supply the current to the pressure-reduction linear control valve 252 are one example of a second pressure-reduction-valve control unit. Elements such as portions of the low-flow-rate supply unit which determine and control the supply current IA supplied to the pressurization linear control valve 250 as a pressurization control valve are one example of a pressurization-valve control unit.

Also, elements such as portions of the input-hydraulic-pressure control device which store and execute the processing at S14 are one example of a feedback control unit.

It is noted that it is not essential that the pressure-reduction linear control valve 252 be used as the pressure differential valve, and a current raised with the increase in the input hydraulic pressure Pin may be supplied to the pressure-reduction linear control valve 252 (in the pulsation damping processing). For example, a current having a magnitude close to that of the valve opening current may be supplied to the pressure-reduction linear control valve 252, and the current indicated by the broken line in FIG. 4(b) (i.e., the valve opening current IopenR+the set value ΔI) may be supplied to the pressure-reduction linear control valve 252.

Also, the target time tref may be a fixed value. In this case, the set flow rate q in the space eliminating processing may also be a fixed value.

Also, the processings in the normal control are not limited to those as in the above-described embodiment.

Also, it is not essential that the regenerative cooperative control be executed. That is, the present invention is applicable to any hydraulic braking system configured to control the hydraulic pressure in the brake cylinders 42, 52 so as to produce the total requested braking force, and the target value for the rear chamber 136 may be determined in any manner.

Also, the cylinder device 66 may have any structure as long as the rear chamber is provided at a rear of the pressurizing piston.

Also, the hydraulic braking system may have any structure. For example, the hydraulic pressure in the transmission chamber 140 may act on the pilot pressure chamber 210 of the regulator 182. Also, the stroke simulator 160 may be provided independently of the cylinder device 66.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

The invention claimed is:

1. A hydraulic braking system comprising:
a cylinder device provided for a vehicle and comprising (a) a cylinder-housing, (b) a pressurizing piston fluid-tightly and slidably fitted in the cylinder-housing, (c) a rear chamber provided at a rear of the pressurizing piston, and (d) a front pressure chamber provided in front of the pressurizing piston, wherein the pressurizing piston is advanced by hydraulic pressure in the rear chamber, causing the front pressure chamber to be disconnected from a reservoir to produce hydraulic pressure;
a brake cylinder, coupled to the front pressure chamber, for a hydraulic brake capable of restraining rotation of a wheel of the vehicle;
a regulator comprising (e) a regulator-housing, (f) a control piston fluid-tightly and slidably fitted in the regulator-housing, (g) an input chamber provided at a rear of the control piston, and (h) an output chamber provided in front of the control piston and coupled to the rear chamber; and
an input-hydraulic-pressure control device that supplies working fluid to the input chamber to advance the control piston, causing the output chamber to be disconnected from the reservoir to produce hydraulic pressure in the output chamber, the input-hydraulic-pressure control device comprising:
a high-flow-rate supply unit that, when an operation of the regulator is started, supplies the working fluid to the input chamber at a set flow rate until the hydraulic pressure in the output chamber reaches a first set pressure that has a magnitude determined based on a lowermost value of the hydraulic pressure in the input chamber that causes the control piston to be advanced; and
a low-flow-rate supply unit that, when the hydraulic pressure in the output chamber exceed the first set pressure, supplies the working fluid to the input chamber at a flow rate that is less than the set flow rate until the hydraulic pressure in the output chamber reaches a second set pressure that has a magnitude determined based on a lowermost value of the hydraulic pressure in the rear chamber that causes the pressurizing piston to be advanced, the second set pressure being higher than the first set pressure.

2. The hydraulic braking system according to claim 1, wherein the high-flow-rate supply unit comprises a set-flow-rate determination unit configured to determine the set flow rate by dividing an input fluid quantity by a target time, wherein the input fluid quantity is a quantity of the working fluid to be supplied to the input chamber which is required for the control piston to be moved from a back end position thereof to a disconnecting position at which the output chamber is disconnected from the reservoir, and the target time is a length of time determined based on at least one of a target value of the hydraulic pressure in the output chamber and an increase gradient of the target value.

3. The hydraulic braking system according to claim 1,
wherein the input-hydraulic-pressure control device comprises a pressurization control valve provided between the input chamber and a pressure source and allowing the working fluid to flow at a higher flow rate in a case where a first supply current is supplied to a coil of the pressurization control valve than in a case where a small supply current, which is less than the first supply current, is supplied to the coil, and
wherein the high-flow-rate supply unit comprises a current control unit configured to control a flow rate of the working fluid by controlling the supply current supplied to the coil of the pressurization control valve.

4. The hydraulic braking system according to claim 1, wherein the input-hydraulic-pressure control device comprises (a) a pressure-reduction control valve provided between the input chamber and the reservoir and configured to be changed from a closed state to an open state when the hydraulic pressure in the input chamber is raised with respect to a supply current supplied to a coil of the pressure-reduction control valve and (b) a first pressure-reduction-valve control unit configured to supply, to the coil of the pressure-reduction control valve, a current having a magnitude that causes the pressure-reduction control valve to be changed from the closed state to the open state, when the hydraulic pressure in the input chamber exceeds a first input set pressure corresponding to the first set pressure for the output chamber.

5. The hydraulic braking system according to claim 1,
wherein the input-hydraulic-pressure control device comprises a pressurization control valve provided between the input chamber and a pressure source and having a characteristic in which a valve opening current is larger in a case where the hydraulic pressure in the input chamber is high than in a case where the hydraulic pressure in the input chamber is low, and
wherein the low-flow-rate supply unit comprises a pressurization-valve control unit configured, when the hydraulic pressure in the output chamber is higher than the first set pressure and equal to or lower than the second set pressure, to supply a current to the pressurization control valve, a magnitude of the current being determined based on the valve opening current.

6. The hydraulic braking system according to claim 1,
wherein the input-hydraulic-pressure control device comprises (a) a pressure-reduction control valve provided between the input chamber and the reservoir and configured to be changed from a closed state to an open state when the hydraulic pressure in the input chamber is raised with respect to a supply current supplied to the pressure-reduction control valve and (b) a second pressure-reduction-valve control unit configured to supply, to the pressure-reduction control valve, a current having a magnitude that causes the pressure-reduction control valve to be changed from the closed state to the open state, when the hydraulic pressure in the input chamber exceeds a second input set pressure corresponding to the second set pressure for the output chamber in a case where the hydraulic pressure in the output chamber is higher than the first set pressure and equal to or lower than the second set pressure.

7. The hydraulic braking system according to claim 1,
wherein the input-hydraulic-pressure control device comprises a feedback control unit configured to execute a feedback control for the hydraulic pressure in the input chamber when the hydraulic pressure in the output chamber is higher than the second set pressure.

8. A hydraulic braking system comprising:
a cylinder device provided for a vehicle and comprising (a) a cylinder-housing, (b) a pressurizing piston fluid-tightly and slidably fitted in the cylinder-housing, (c) a rear chamber provided at a rear of the pressurizing piston, and (d) a front pressure chamber provided in front of the pressurizing piston, wherein the pressurizing piston is advanced by hydraulic pressure in the rear chamber, causing the front pressure chamber to be disconnected from a reservoir to produce hydraulic pressure;
a brake cylinder, coupled to the front pressure chamber, for a hydraulic brake capable of restraining rotation of a wheel of the vehicle;
a regulator comprising (e) a regulator-housing, (f) a control piston fluid-tightly and slidably fitted in the regulator-housing, (g) an input chamber provided at a rear of the control piston, and (h) an output chamber provided in front of the control piston and coupled to the rear chamber; and
an input-hydraulic-pressure control device configured to supply working fluid to the input chamber to advance the control piston, causing the output chamber to be disconnected from the reservoir to produce hydraulic pressure in the output chamber, the input-hydraulic-pressure control device comprising an input-flow-rate restraining unit configured to keep an input flow rate of the working fluid supplied to the input chamber less than a set flow rate for a duration that the hydraulic pressure in the output chamber is higher than a first set pressure and equal to or lower than a second set pressure in a starting operation of the regulator,
wherein the first set pressure has a magnitude determined based on a lowermost value of the hydraulic pressure in the input chamber that causes the control piston to be advanced, and
wherein the second set pressure has a magnitude determined based on a lowermost value of the hydraulic pressure in the rear chamber that causes the pressurizing piston to be advanced and the second set pressure is higher than the first set pressure.

* * * * *